Nov. 11, 1969  G. H. MILLIGAN  3,477,694
BAR STOCK VALVE AND METHOD OF MAKING THE SAME
Filed May 31, 1967  4 Sheets-Sheet 1

INVENTOR.
GORDON H. MILLIGAN
BY
Herman Foster
ATTORNEY

Nov. 11, 1969 G. H. MILLIGAN 3,477,694
BAR STOCK VALVE AND METHOD OF MAKING THE SAME
Filed May 31, 1967 4 Sheets-Sheet 2
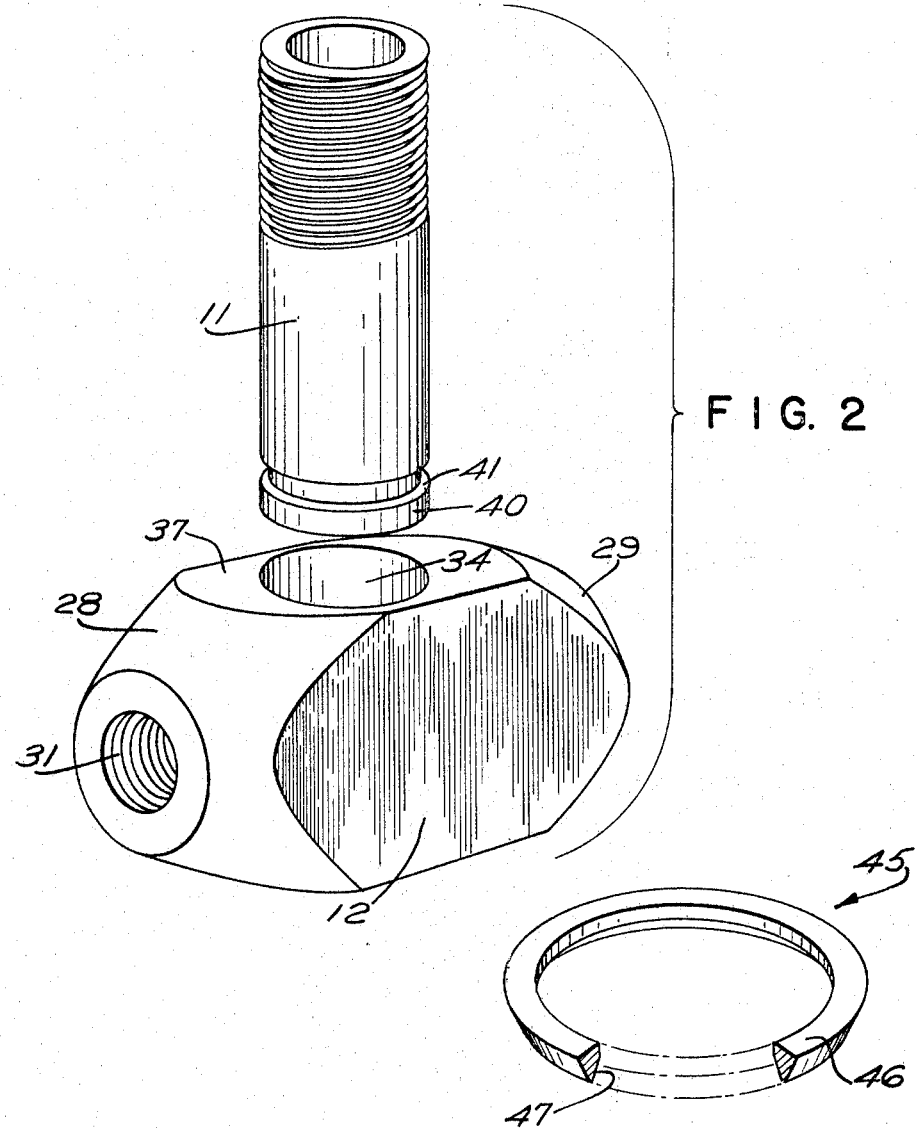
INVENTOR.
GORDON H. MILLIGAN
BY
Herman Foster
ATTORNEY INVENTOR.
GORDON H. MILLIGAN
BY Herman Foster
ATTORNEY Nov. 11, 1969  G. H. MILLIGAN  3,477,694
BAR STOCK VALVE AND METHOD OF MAKING THE SAME
Filed May 31, 1967  4 Sheets-Sheet 4

INVENTOR.
GORDON H. MILLIGAN
BY Herman Foster
ATTORNEY

United States Patent Office 3,477,694
Patented Nov. 11, 1969

3,477,694
BAR STOCK VALVE AND METHOD OF MAKING THE SAME
Gordon H. Milligan, Pawtucket, R.I., assignor to Grinnell Corporation, Providence, R.I., a corporation of Delaware
Filed May 31, 1967, Ser. No. 642,003
Int. Cl. F16k 15/18, 5/00
U.S. Cl. 251—367                                   9 Claims

ABSTRACT OF THE DISCLOSURE

A bar stock valve having a bonnet and body joined by swaging a portion of the body into a groove running about the periphery of the lower end of the bonnet. The swaging is preferably accomplished by forcing a hardened ring into the body about the bonnet.

BACKGROUND OF THE INVENTION

This invention relates to valves for high pressure use which are known as bar valves. In particular it is concerned with a bar stock needle valve which is constructed of two separate portions, a body and a bonnet, which are mechanically, permanently joined. The invention also deals with the manufacturing process by which these two portions are joined. Broadly stated, the invention can be said to come within the class of procedures by which a portion of the bonnet is inserted in an opening of the body and portions of the opening wall are then collapsed about the inserted bonnet portion to sealingly grasp and retain the bonnet in place.

Basically, past practice has generally taken the approach of joining the bonnets of bar stock valves to the bodies by screwing them into threaded openings in the bodies. Since the threads act as seals as well as retaining means, they must be highly accurate and finished (sometimes these threads are rolled) and preferably tapered. Naturally, to obtain such threads requires a great deal of care and precision and considerable time and expense. To overcome these obstacles some manufacturers have utilized the practice of forging the body and bonnet as a single unit. Such a practice, however, requires expensive forging equipment and therefore the ultimate costs for either method approach the same high figure.

SUMMARY OF THE INVENTION

The present inventon overcomes the problems raised by the above described methods. No heavy forging equipment is required because the body and bonnet are two separate units which are sealingly joined. Instead of threads, a swaging operation is used which is described in greater detail below.

All that is required to join the two portions is a press considerably smaller than would be required for a forging operation. Without the steps of cutting and fitting precise threads or the necessity for heavy forging equipment considerable savings in money and time is a benefit derived from the present invention.

Thus, what is desired and obtained is a bar stock valve whose bonnet and body are joined by working the walls of the opening in the body, into which the bonnet is inserted, into sealing and holding engagement with the bonnet. The metal to metal seal is capable of preventing leakage despite the high pressures under which these valves are normally used.

The advantages will become more clearly apparent through a perusal of the following description taken with the accompanying drawings.

BRIEF DESCRIPTION OF THE DRAWING

FIG. 2 is an exploded perspective view showing the body with the bonnet about to be inserted into the body.

FIG. 3 is a partial sectional perspective view of the swaging ring per se.

DESCRIPTION OF THE PREFERRED EMBODIMENT

Figure 1:
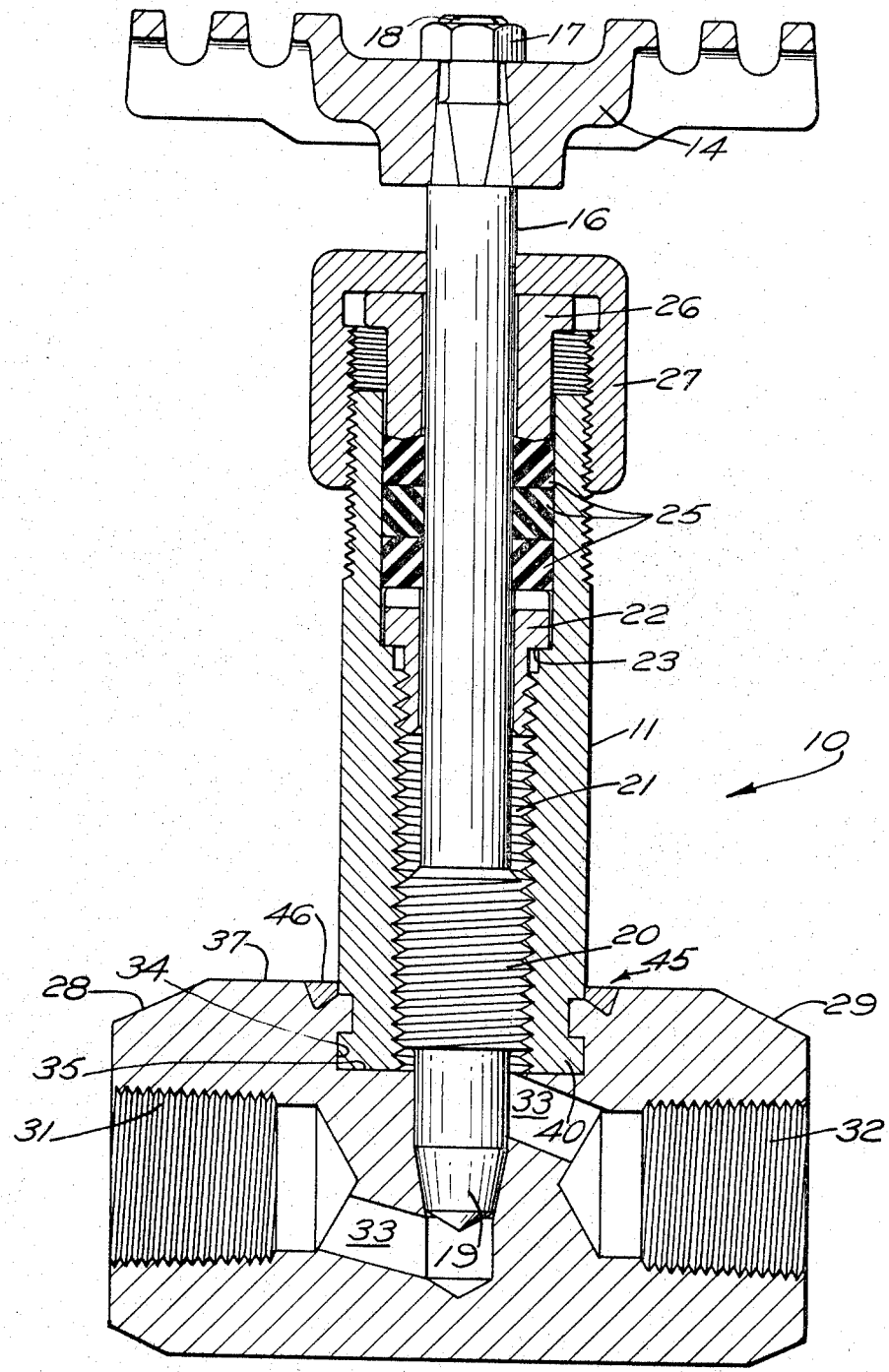
FIG. 1 is a vertical sectional view of the entire assembled valve.

Referring in greater particularity to the drawing, 10 generally designates the novel valve which is constructed from two basic components, a bonnet 11 and a body 12. The bonnet 11 contains all of the actuating mechanism for the valve. This comprises a handwheel 14 fastened to a stem 16 by means of a nut 17 turned down on the top threaded portion 18 of the stem 16. At the lower end of the stem is a conical plug 19 which, when seated, shuts off flow in the valve. Intermediate the plug and handwheel the stem 16 has a threaded portion 20 which engages the threaded interior 21 of the bonnet 11. Thus, turning of the stem permits vertical travel of the plug from a closed to open to closed position.

Figure 4:
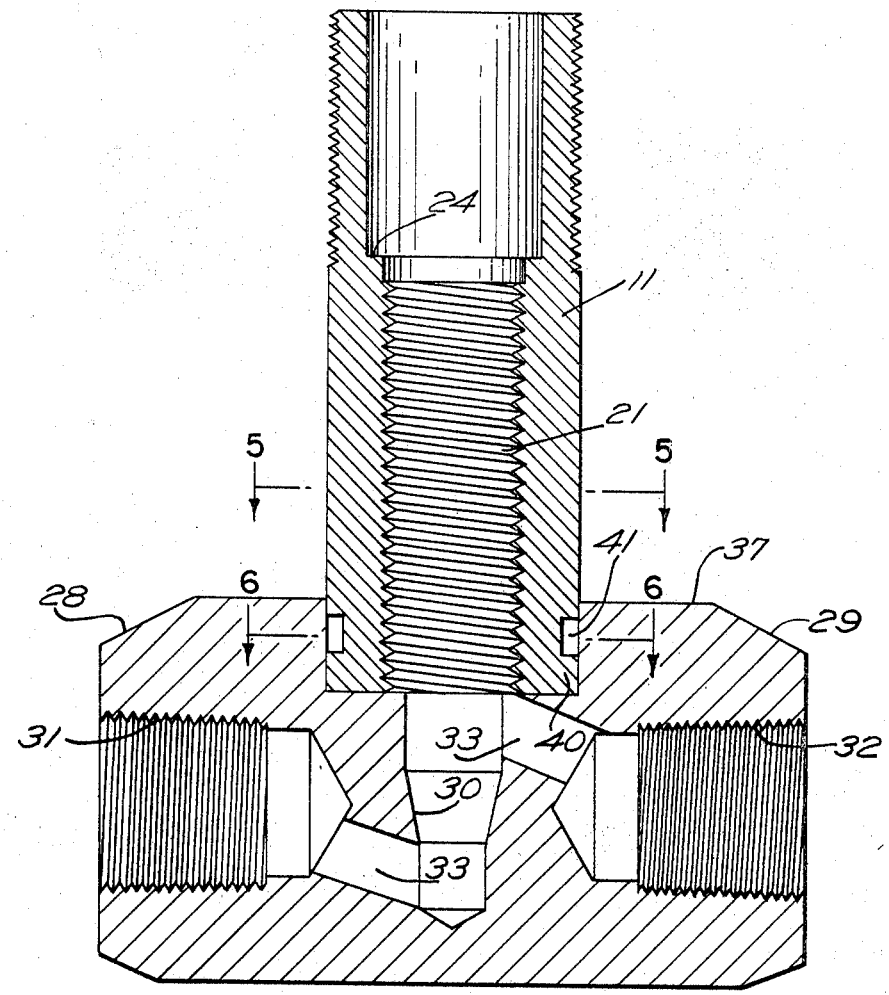
FIG. 4 is a side elevational section of the body and bonnet inserted in the body just prior to the swaging operation.
Figure 5:
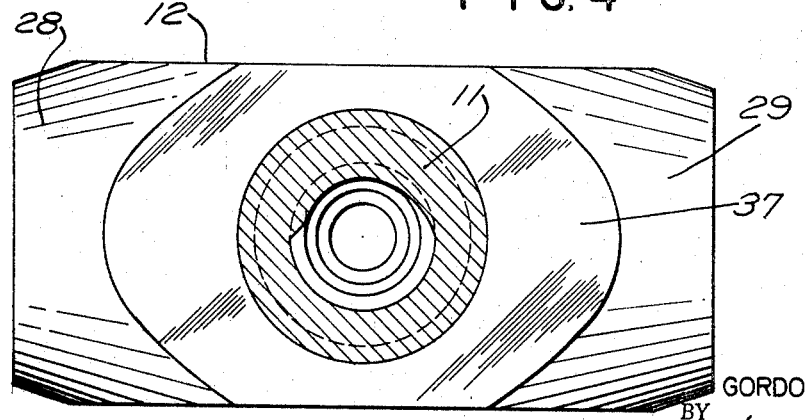
FIG. 5 is a sectional view along line 5—5 of FIG. 4.
Figure 6:
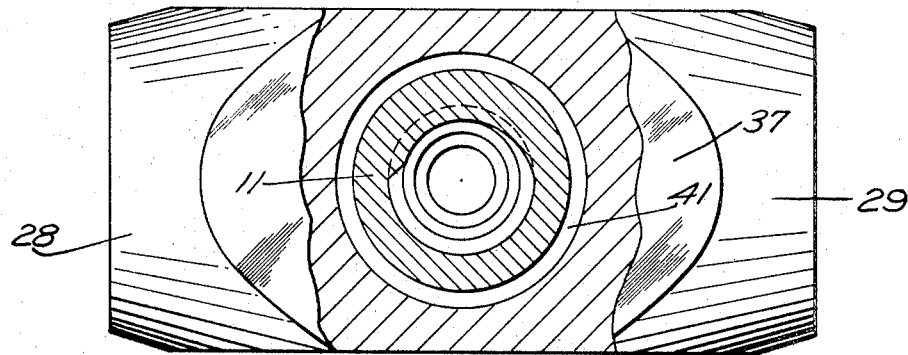
FIG. 6 is a sectional view along line 6—6 of FIG. 4.
Figure 7:
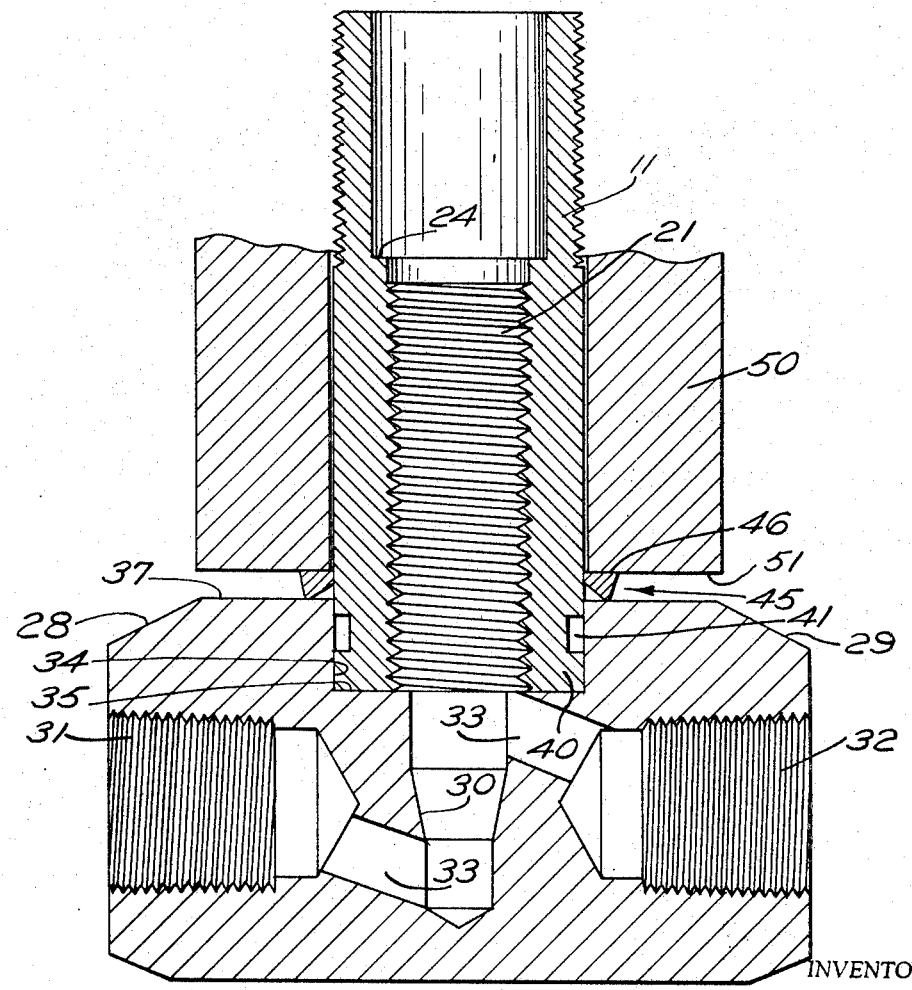
FIG. 7 is a view similar to that of FIG. 3 showing the swaging tool in position for joining the bonnet and body.

Also contained within the bonnet 11 is a thimble 22 which has a downwardly facing shoulder 23 for engaging and upwardly facing shoulder 24 (see FIG. 4) on the interior of the bonnet. This thimble serves two purposes. It acts as a base for the packing 25 thus forming a packing-under-pressure joint, and it also acts as a limit stop to prevent the stem from being accidentally turned out of the valve. At the top of the packing 25 is a gland 26 which transmits pressure to the packing as the packing nut 27 is turned down onto the bonnet.

The body 12 is shown as a standard Globe type valve body with an integral conical seat 30. The two ends 28 and 29 are internally threaded at 31 and 32 respectively for joining in a pipe line. Between the two ends is a flow passage 33 through which flow is stopped by the seating of conical plug 19 on the seat 30.

Directly above the seat and extending through the body is an opening 34 into which the bonnet 11 is inserted. The lower end 40 of the bonnet contains a circular groove 41, preferably of rectangular cross-section.

The joining of body 12 and bonnet 11 is accomplished by inserting the end 40 of the bonnet into the opening 34 in the body until the end rests on the bottom 35 of the opening. This places the top of groove 41 beneath the top lip 36 of opening 34 approximately 1/10 of the depth of opening 34. The groove 41 has been shown and described as being of rectangular cross-section. The present groove extends so that its width, measured vertically along the bonnet, is approximately 2/5 of the depth of opening 34. However, it should be understood that other cross-sectional shapes and dimensions can be found suitable.

Once the bonnet has been inserted into the body a swaging ring 45 is slipped over the bonnet in sliding engagement therewith and rested on the top of body 12. This ring is of metal of a greater hardness than the metal of the body. Thus under pressure the body metal will flow before the ring yields to any force. A sleeve 50 is then placed in sliding engagement over the bonnet until it rests on the top flat surface 46 of the ring. The bottom 51 of the sleeve is also flat to give a good bearing distribution on the ring, and is greater in diameter than the ring so that when the bottom 51 engages the top surface 37 of the body 12 it will act as a stop. The top of the sleeve (not shown) is retained in a press and constructed to move with the press and transmit the necessary swaging force to the ring.

The actual joining and sealing of body 12 and bonnet 11 occurs by pressing the ring 45 down into the body 12. The ring is preferably of thet same volume as the groove 41. Therefore, as the ring is pressed into the body by sleeve 50 the body metal wall of opening 34 adjacent the groove 41 begins to flow into the groove 41. When the top 46 of the ring is flush with the top 37 of the body all of the groove 41 is full and the joining and sealing operation is complete. The flow of metal into groove 41 is encouraged by the slant inner face 47 of the ring. This face slopes downwardly and outwardly and thus pushes the body metal inwardly and downwardly toward the groove 41 which is the only available space to which the displaced metal can go.

It is to be understood that terms of reference in the following claims such as "upper," "lower," etc., are merely intended to simplify the recitation of the relationship of the parts to each other and are not intended to limit the orientation of the combination.

I claim:
1. A method of joining a bonnet of a valve to a body of said valve comprising:
   (A) providing a cylindrical bonnet member having a circular groove in its periphery adjacent the lower end of said bonnet,
   (B) providing a body member having an opening in its upper surface adapted to snugly receive said bonnet lower end and groove with said bonnet resting on the bottom of said opening,
   (C) inserting said bonnet lower end into said body member opening until said bonnet end rests on the bottom of said opening,
   (D) forcing a portion of said body member upper surface adjacent said opening downwardly with sufficient force to cause said body member material forming a portion of the sidewall of said opening to cold flow into said groove to fluid tightly seal and retain said bonnet end in said body member.

2. A method as called for in claim 1 wherein step D, the forcing of said body member upper surface, is accomplished by:
   (A) slipping a ring of greater hardness than said body member over said bonnet member in a snug sliding relationship and
   (B) pressing said ring into said body member to cause said cold flow.

3. A method as called for in claim 2 wherein said ring has a top flat surface and a volume substantially equal to said groove in said bonnet member and is pressed into said body member until said ring top flat surface is substantially even with said body upper surface.

4. A method as called for in claim 3 wherein said ring which forces said body material toward and into said groove.

5. A valve comprising:
   (a) a metal cylindrical bonnet portion, said bonnet portion including
       (1) a lower end
       (2) a circular groove in its periphery adjacent said lower end
   (b) a metal body member including:
       (1) a flat upper surface
       (2) an opening in said upper surface extending into the interior of said body member and defined by a substantially cylindrical body wall and terminating in a bottom
       (3) said lower end and said groove being contained within said opening with said lower end in engagement with said opening bottom
           (a) said groove being substantially filled with metal from said body opening wall which is integral with said wall to fluid tightly seal the bonnet portion within said opening.

6. A valve as called for in claim 5 further comprising a ring of greater hardness than said body member surrounding said bonnet portion and being embedded in said body upper surface.

7. A valve as called for in claim 5 wherein said ring has a flat top surface substantial even with said flat upper body surface and is the same in volume as said groove.

8. A valve as called for in claim 6 wherein said groove is substantially rectangular in shape in cross-section and the upper edge of said groove is beneath the flat upper surface of said body member a distance approximately 1/10 the distance from the flat upper surface to the bottom of said opening.

9. A valve as called for in claim 8 wherein said ring has an outwardly and downwardly sloping lower face has a flat top surface substantially even with said flat upper body surface and is substantially the same in volume as said groove.

References Cited
UNITED STATES PATENTS

| | | | |
|---|---|---|---|
| 1,858,927 | 5/1932 | Gray et al. | 29—157.1 |
| 2,644,350 | 7/1953 | Regimbald | 29—511 |
| 2,840,113 | 6/1958 | Simpson et al. | 29—511 XR |
| 2,852,843 | 9/1958 | Banta et al. | 29—520 XR |
| 2,903,564 | 9/1959 | Carr | 29—157.1 XR |
| 3,055,100 | 9/1962 | Kimpel | 29—520 |
| 3,191,268 | 6/1965 | Matea | 29—511 XR |
| 3,270,793 | 9/1966 | Polmon | 29—509 |
| 3,295,191 | 1/1967 | Gallagher et al. | 29—157.1 |
| 3,297,071 | 1/1967 | Neuschotz et al. | 29—509 XR |

SAMUEL SCOTT, Primary Examiner

U.S. Cl. X.R.

29—157.1, 509, 520

UNITED STATES PATENT OFFICE
CERTIFICATE OF CORRECTION

Patent No. 3,477,694                 November 11, 1969

Gordon H. Milligan

It is certified that error appears in the above identified patent and that said Letters Patent are hereby corrected as shown below:

Column 4, line 36, cancel "has an outwardly and downwardly sloping lower face" and insert the same after "ring" in line 59, column 3.

Signed and sealed this 20th day of October 1970.

(SEAL)
Attest:

Edward M. Fletcher, Jr.
Attesting Officer

WILLIAM E. SCHUYLER, JR.
Commissioner of Patents